United States Patent
Jacobs et al.

(10) Patent No.: US 11,243,747 B2
(45) Date of Patent: Feb. 8, 2022

(54) APPLICATION DIGITAL CONTENT CONTROL USING AN EMBEDDED MACHINE LEARNING MODULE

(71) Applicant: Adobe Inc., San Jose, CA (US)

(72) Inventors: Thomas William Randall Jacobs, Cupertino, CA (US); Peter Raymond Fransen, Soquel, CA (US); Kevin Gary Smith, Lehi, UT (US); Kent Andrew Edmonds, San Jose, CA (US); Jen-Chan Jeff Chien, Saratoga, CA (US); Gavin Stuart Peter Miller, Los Altos, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/007,253

(22) Filed: Aug. 31, 2020

(65) Prior Publication Data

US 2020/0401380 A1    Dec. 24, 2020

Related U.S. Application Data

(62) Division of application No. 15/785,298, filed on Oct. 16, 2017, now Pat. No. 10,795,647.

(51) Int. Cl.
*G06F 8/33* (2018.01)
*G06N 20/00* (2019.01)
(Continued)

(52) U.S. Cl.
CPC ............ *G06F 8/33* (2013.01); *G06F 21/6245* (2013.01); *G06N 5/02* (2013.01); *G06N 20/00* (2019.01)

(58) Field of Classification Search
CPC ....... G06F 8/33; G06F 21/6245; G06N 20/00; G06N 5/02
See application file for complete search history.

(56) References Cited

U.S. PATENT DOCUMENTS 6,922,699 B2   7/2005   Schuetze et al.
7,240,077 B1   7/2007   Edelman et al.
(Continued)

FOREIGN PATENT DOCUMENTS

WO   WO-2015027223   2/2015

OTHER PUBLICATIONS

"Corrected Notice of Allowability", U.S. Appl. No. 15/726,125, dated Mar. 18, 2020, 2 pages.
(Continued)

*Primary Examiner* — Daxin Wu
(74) *Attorney, Agent, or Firm* — FIG. 1 Patents

(57) ABSTRACT

Application personalization techniques and systems are described that leverage an embedded machine learning module to preserve a user's privacy while still supporting rich personalization with improved accuracy and efficiency of use of computational resources over conventional techniques and systems. The machine learning module, for instance, may be embedded as part of an application to execute within a context of the application to learn user preferences to train a model using machine learning. This model is then used within the context of execution of the application to personalize the application, such as control access to digital content, make recommendations, control which items of digital marketing content are exposed to a user via the application, and so on.

20 Claims, 7 Drawing Sheets

(51) Int. Cl.
  *G06F 21/62* (2013.01)
  *G06N 5/02* (2006.01)

(56) References Cited

U.S. PATENT DOCUMENTS

| | | |
|---|---|---|
| 7,882,045 B1 | 2/2011 | Cole et al. |
| 7,890,571 B1 | 2/2011 | Kriegsman et al. |
| 8,005,837 B2 | 8/2011 | Lee et al. |
| 8,442,683 B2 | 5/2013 | Lee |
| 8,566,712 B1 | 10/2013 | Varian |
| 8,626,718 B2 | 1/2014 | Rozensztejn et al. |
| 8,752,112 B2 | 6/2014 | Krasic et al. |
| 9,055,124 B1 | 6/2015 | Hill |
| 9,117,227 B1 | 8/2015 | Agrawal et al. |
| 9,134,978 B1 | 9/2015 | Roskind |
| 9,152,624 B1 | 10/2015 | Krallman et al. |
| 9,367,524 B1 | 6/2016 | Filev et al. |
| 9,396,483 B2 | 7/2016 | Hamedi |
| 9,554,093 B2 | 1/2017 | Hua et al. |
| 9,646,227 B2 | 5/2017 | Suri et al. |
| 9,736,503 B1 | 8/2017 | Bakshi et al. |
| 9,811,590 B1 | 11/2017 | Acharya et al. |
| 9,904,949 B1* | 2/2018 | Tavernier ............ G06Q 30/0631 |
| 9,923,860 B2* | 3/2018 | Krishnaswamy ....... H04L 51/16 |
| 10,163,173 B1 | 12/2018 | McKinley et al. |
| 10,339,173 B2 | 7/2019 | Kelley et al. |
| 10,341,199 B2 | 7/2019 | Peri et al. |
| 10,600,075 B2 | 3/2020 | Fabbri et al. |
| 10,657,118 B2 | 5/2020 | Miller et al. |
| 10,685,375 B2 | 6/2020 | Goldman et al. |
| 10,733,262 B2 | 8/2020 | Miller et al. |
| 10,795,647 B2 | 10/2020 | Jacobs et al. |
| 10,853,766 B2 | 12/2020 | Balakrishnan et al. |
| 10,943,257 B2 | 3/2021 | Goldman et al. |
| 2001/0035873 A1 | 11/2001 | Easter |
| 2002/0107926 A1 | 8/2002 | Lee |
| 2002/0150295 A1 | 10/2002 | Kwok et al. |
| 2004/0133081 A1 | 7/2004 | Teller et al. |
| 2005/0002586 A1 | 1/2005 | Liege et al. |
| 2005/0033657 A1 | 2/2005 | Herrington et al. |
| 2006/0048092 A1 | 3/2006 | Kirkley |
| 2006/0080314 A1 | 4/2006 | Hubert et al. |
| 2006/0085255 A1 | 4/2006 | Hastings et al. |
| 2007/0033093 A1 | 2/2007 | Divine et al. |
| 2007/0250901 A1 | 10/2007 | McIntire |
| 2008/0040318 A1 | 2/2008 | Stanis et al. |
| 2008/0120646 A1 | 5/2008 | Stern et al. |
| 2008/0215509 A1 | 9/2008 | Charlton |
| 2008/0249855 A1 | 10/2008 | Collins et al. |
| 2009/0006467 A1 | 1/2009 | Visscher |
| 2009/0066641 A1* | 3/2009 | Mahajan ................ A63F 13/10 |
| | | 345/156 |
| 2009/0079871 A1 | 3/2009 | Hua et al. |
| 2009/0092374 A1 | 4/2009 | Kulas |
| 2009/0144129 A1 | 6/2009 | Grouf et al. |
| 2010/0017885 A1 | 1/2010 | Cohen et al. |
| 2010/0023393 A1 | 1/2010 | Costy |
| 2010/0050098 A1 | 2/2010 | Turner |
| 2010/0118035 A1 | 5/2010 | Yamakami |
| 2010/0120402 A1 | 5/2010 | Sethi et al. |
| 2010/0161717 A1 | 6/2010 | Albrecht et al. |
| 2011/0040611 A1 | 2/2011 | Simmons et al. |
| 2011/0153414 A1 | 6/2011 | Elvekrog et al. |
| 2011/0239253 A1 | 9/2011 | West et al. |
| 2011/0258036 A1 | 10/2011 | Ioffe et al. |
| 2011/0320441 A1 | 12/2011 | Lee et al. |
| 2012/0054596 A1 | 3/2012 | Kroger et al. |
| 2012/0109609 A1 | 5/2012 | Weber et al. |
| 2012/0116868 A1 | 5/2012 | Chin et al. |
| 2012/0130802 A1 | 5/2012 | Shimizu |
| 2012/0272160 A1 | 10/2012 | Spivack et al. |
| 2013/0124298 A1 | 5/2013 | Li et al. |
| 2013/0159110 A1 | 6/2013 | Rajaram et al. |
| 2013/0304604 A1 | 11/2013 | Hoffman et al. |
| 2013/0346347 A1* | 12/2013 | Patterson ............... G06N 20/00 |
| | | 706/12 |
| 2014/0040067 A1 | 2/2014 | England et al. |
| 2014/0046777 A1 | 2/2014 | Markey et al. |
| 2014/0047335 A1 | 2/2014 | Lewis et al. |
| 2014/0114746 A1 | 4/2014 | Pani et al. |
| 2014/0130076 A1 | 5/2014 | Moore et al. |
| 2014/0156379 A1 | 6/2014 | Pani et al. |
| 2014/0156416 A1 | 6/2014 | Goenka et al. |
| 2014/0200989 A1 | 7/2014 | Cohen Kassko et al. |
| 2014/0324604 A1 | 10/2014 | Torres et al. |
| 2014/0372901 A1 | 12/2014 | Catlin et al. |
| 2015/0006295 A1 | 1/2015 | Liu et al. |
| 2015/0100377 A1 | 4/2015 | Penumaka et al. |
| 2015/0112980 A1 | 4/2015 | Sanio et al. |
| 2015/0149281 A1 | 5/2015 | Carrotte et al. |
| 2015/0161648 A1 | 6/2015 | Heath et al. |
| 2015/0324867 A1 | 11/2015 | Jalili |
| 2015/0379557 A1 | 12/2015 | Liu et al. |
| 2016/0007083 A1 | 1/2016 | Gurha |
| 2016/0019243 A1 | 1/2016 | Kamel et al. |
| 2016/0071162 A1 | 3/2016 | Ogawa et al. |
| 2016/0078520 A1 | 3/2016 | Nice et al. |
| 2016/0086215 A1 | 3/2016 | Wang et al. |
| 2016/0189201 A1 | 6/2016 | Shao |
| 2016/0286244 A1* | 9/2016 | Chang ................ H04N 21/4788 |
| 2016/0300135 A1 | 10/2016 | Moudy et al. |
| 2016/0335339 A1 | 11/2016 | Venkataraman et al. |
| 2016/0379244 A1 | 12/2016 | Kalish et al. |
| 2017/0017986 A1 | 1/2017 | Mathis et al. |
| 2017/0032483 A1 | 2/2017 | Steelberg et al. |
| 2017/0061500 A1 | 3/2017 | Borodin |
| 2017/0078350 A1 | 3/2017 | Gordon |
| 2017/0098236 A1 | 4/2017 | Lee et al. |
| 2017/0099525 A1 | 4/2017 | Ray et al. |
| 2017/0140249 A1 | 5/2017 | Lee et al. |
| 2017/0140283 A1 | 5/2017 | Cheng et al. |
| 2017/0149852 A1 | 5/2017 | Selekman et al. |
| 2017/0161773 A1 | 6/2017 | Xu et al. |
| 2017/0161794 A1 | 6/2017 | Zhu et al. |
| 2017/0220694 A1 | 8/2017 | Vaish et al. |
| 2017/0337234 A1 | 11/2017 | Goldman et al. |
| 2018/0004847 A1 | 1/2018 | Kulkarni et al. |
| 2018/0012253 A1 | 1/2018 | Gavlovski et al. |
| 2018/0040019 A1 | 2/2018 | Gavlovski et al. |
| 2018/0040029 A1 | 2/2018 | Zeng et al. |
| 2018/0060921 A1 | 3/2018 | Mengle et al. |
| 2018/0101611 A1 | 4/2018 | McDevitt et al. |
| 2018/0101774 A1 | 4/2018 | Werris |
| 2018/0109612 A1 | 4/2018 | Zhong et al. |
| 2018/0181375 A1* | 6/2018 | Hermet-Chavanne .... G06F 8/38 |
| 2018/0189074 A1 | 7/2018 | Kulkarni et al. |
| 2018/0189822 A1 | 7/2018 | Kulkarni et al. |
| 2018/0189843 A1 | 7/2018 | Kulkarni et al. |
| 2018/0225705 A1 | 8/2018 | Ferber et al. |
| 2018/0240152 A1 | 8/2018 | Mookherjee et al. |
| 2018/0276720 A1 | 9/2018 | Yang et al. |
| 2018/0300046 A1 | 10/2018 | Goyal et al. |
| 2019/0034809 A1 | 1/2019 | Xu et al. |
| 2019/0034976 A1 | 1/2019 | Hamedi et al. |
| 2019/0050456 A1 | 2/2019 | Gupta et al. |
| 2019/0080019 A1 | 3/2019 | Young et al. |
| 2019/0080347 A1 | 3/2019 | Smith |
| 2019/0086988 A1* | 3/2019 | He ........................ G06N 20/00 |
| 2019/0095945 A1 | 3/2019 | Fabbri et al. |
| 2019/0095949 A1 | 3/2019 | Chien et al. |
| 2019/0108250 A1 | 4/2019 | Miller et al. |
| 2019/0108288 A1 | 4/2019 | Miller et al. |
| 2019/0114151 A1 | 4/2019 | Jacobs et al. |
| 2019/0114663 A1 | 4/2019 | Goldman et al. |
| 2019/0114664 A1 | 4/2019 | Goldman et al. |
| 2019/0114672 A1 | 4/2019 | Jacobs et al. |
| 2019/0114680 A1 | 4/2019 | Chien et al. |
| 2019/0130356 A1 | 5/2019 | Balakrishnan et al. |
| 2019/0130458 A1 | 5/2019 | Balakrishnan et al. |
| 2019/0164082 A1 | 5/2019 | Wu |
| 2019/0205919 A1 | 7/2019 | Goksel et al. |
| 2019/0279260 A1 | 9/2019 | Carpita et al. |
| 2020/0021873 A1 | 1/2020 | Swaminathan et al. |

(56) References Cited

U.S. PATENT DOCUMENTS

2020/0218709 A1 7/2020 Miller
2020/0265463 A1 8/2020 Goldman et al.

OTHER PUBLICATIONS

"Corrected Notice of Allowability", U.S. Appl. No. 15/726,125, dated Apr. 24, 2020, 2 pages.
"Corrected Notice of Allowability", U.S. Appl. No. 15/785,298, dated Aug. 27, 2020, 2 pages.
"Corrected Notice of Allowability", U.S. Appl. No. 15/785,298, dated Sep. 10, 2020, 2 pages.
"Examiner's Answer", U.S. Appl. No. 15/783,228, dated Sep. 29, 2020, 20 pages.
"Final Office Action", U.S. Appl. No. 15/726,125, dated Sep. 13, 2019, 11 pages.
"Final Office Action", U.S. Appl. No. 15/726,168, dated Dec. 11, 2019, 11 pages.
"Final Office Action", U.S. Appl. No. 15/783,228, dated Oct. 24, 2019, 23 pages.
"Final Office Action", U.S. Appl. No. 15/785,298, dated Apr. 17, 2019, 24 pages.
"Final Office Action", U.S. Appl. No. 15/716,348, dated Jul. 23, 2019, 25 pages.
"Final Office Action", U.S. Appl. No. 15/716,348, dated Aug. 7, 2020, 28 pages.
"Final Office Action", U.S. Appl. No. 15/801,173, dated Sep. 16, 2020, 30 pages.
"Final Office Action", U.S. Appl. No. 15/782,517, dated Aug. 7, 2020, 38 pages.
"First Action Interview Office Action", U.S. Appl. No. 15/716,348, dated Feb. 20, 2019, 3 pages.
"First Action Interview Office Action", U.S. Appl. No. 15/782,457, dated Oct. 29, 2019, 3 pages.
"First Action Interview Office Action", U.S. Appl. No. 15/801,090, dated Apr. 14, 2020, 4 pages.
"First Action Interview Office Action", U.S. Appl. No. 15/785,298, dated Oct. 1, 2018, 4 pages.
"First Action Interview Office Action", U.S. Appl. No. 15/726,168, dated Jun. 28, 2019, 6 pages.
"First Action Interview Office Action", U.S. Appl. No. 15/783,228, dated Aug. 22, 2019, 8 pages.
"Global Unique Identifier", Tech Terms, Retrieved at: https://techterms.com/definition/guid, Oct. 13, 2008, 1 page.
"Non-Final Office Action", U.S. Appl. No. 15/785,298, dated Dec. 9, 2019, 11 pages.
"Non-Final Office Action", U.S. Appl. No. 15/785,298, dated Sep. 14, 2018, 17 pages.
"Non-Final Office Action", U.S. Appl. No. 15/801,173, dated Oct. 30, 2019, 22 pages.
"Non-Final Office Action", U.S. Appl. No. 15/801,090, dated Mar. 10, 2020, 26 pages.
"Non-Final Office Action", U.S. Appl. No. 15/716,348, dated Mar. 25, 2020, 26 pages.
"Non-Final Office Action", U.S. Appl. No. 15/801,173, dated Mar. 31, 2020, 26 pages.
"Non-Final Office Action", U.S. Appl. No. 15/783,228, dated Apr. 17, 2020, 30 pages.
"Non-Final Office Action", U.S. Appl. No. 15/782,517, dated Dec. 12, 2019, 30 pages.
"Notice of Allowance", U.S. Appl. No. 15/713,339, dated Nov. 25, 2019, 13 pages.
"Notice of Allowance", U.S. Appl. No. 15/782,457, dated Feb. 7, 2020, 14 pages.
"Notice of Allowance", U.S. Appl. No. 15/801,090, dated Aug. 13, 2020, 15 pages.
"Notice of Allowance", U.S. Appl. No. 15/785,298, dated Jun. 1, 2020, 7 pages.
"Notice of Allowance", U.S. Appl. No. 15/726,125, dated Jan. 8, 2020, 8 pages.
"Notice of Allowance", U.S. Appl. No. 16/867,321, dated Oct. 5, 2020, 8 pages.
"Notice of Allowance", U.S. Appl. No. 15/726,168, dated Mar. 26, 2020, 9 pages.
"Pre-Interview First Office Action", U.S. Appl. No. 15/716,348, dated Jan. 29, 2019, 3 pages.
"Pre-Interview First Office Action", U.S. Appl. No. 15/713,339, dated Aug. 8, 2019, 3 pages.
"Pre-Interview First Office Action", U.S. Appl. No. 15/782,457, dated Sep. 11, 2019, 4 pages.
"Pre-Interview First Office Action", U.S. Appl. No. 15/785,298, dated Sep. 21, 2018, 4 pages.
"Pre-Interview First Office Action", U.S. Appl. No. 16/827,413, dated Nov. 25, 2020, 4 pages.
"Pre-Interview First Office Action", U.S. Appl. No. 15/801,173, dated Dec. 2, 2019, 4 pages.
"Pre-Interview First Office Action", U.S. Appl. No. 15/801,090, dated Mar. 16, 2020, 5 pages.
"Pre-Interview First Office Action", U.S. Appl. No. 15/726,168, dated Mar. 19, 2019, 7 pages.
"Pre-Interview First Office Action", U.S. Appl. No. 15/726,125, dated Jul. 11, 2109, 7 pages.
"Pre-Interview First Office Action", U.S. Appl. No. 15/783,228, dated Jul. 8, 2019, 8 pages.
"Restriction Requirement", U.S. Appl. No. 15/782,517, dated Jul. 11, 2019, 7 pages.
"Restriction Requirement", U.S. Appl. No. 15/785,298, dated Jul. 19, 2018, 7 pages.
"Supplemental Notice of Allowability", U.S. Appl. No. 15/801,090, dated Oct. 23, 2020, 2 pages.
Benjamin, Dan, "Random Image Rotation", A List Apart Blog [retrieved Nov. 25, 2020]. Retrieved from the Internet <https://alistapart.com/article/randomizer/>., Oct. 20, 2003, 28 pages.
Foley, Joe, "How to Get WordPress Rotating Header Images", WPMU Dev Blog [retrieved Nov. 25, 2020]. Retrieved from the Internet <https://premium.wpmudev.org/blog/wordpress-rotating-header-images/>., Apr. 19, 2013, 13 pages.
Forrest, Conner, "How Google wants to crowdsource machine learning with smartphones and Federated Learning", Retrieved at: https://www.techrepublic.com/article/how-google-wants-to-crowdsource-machine-learning-with-smartphones-and-federated-learning/, Apr. 7, 2017, 10 pages.
Frey, Nathan et al., "Automated Advertisement Creation System", IP.com No. IPCOM000251275D, Oct. 29, 2017, 10 pages.
McMahan, H B. et al., "Communication-Efficient Learning of Deep Networks from Decentralized Data", Proceedings of the 20 th International Conference on Artificial Intelligence and Statistics (AISTATS) 2017. JMLR: W&CP vol. 54, Feb. 28, 2017, 11 pages.
Ohanian, Tom, "How Artificial Intelligence and Machine Learning Will Change Content Creation Methodologies", SMPTE 2017 Annual Technical Conference and Exhibition, Hollywood & Highland, Los Angeles, California, Oct. 23, 2017, 15 pages.
Thai, Jenny, "The GACTS of life: how we mastered the marketing brief", https://wavelength.asana.com/workstyle-gacts-mastered-marketing-brief/#close, Apr. 28, 2016, 11 pages.
Xia, Bohui et al., "Deep Neural Network-Based Click-Through Rate Prediction using Multimodal Features of Online Banners", 2019 IEEE Fifth International Conference on Multimedia Big Data (Big MM), Sep. 11, 2019, 9 pages.
"First Action Interview Office Action", U.S. Appl. No. 15/785,329, dated May 14, 2021, 4 pages.
"Non-Final Office Action", U.S. Appl. No. 16/827,413, dated Mar. 31, 2021, 11 pages.
"Non-Final Office Action", U.S. Appl. No. 15/716,348, dated Mar. 29, 2021, 26 pages.
"Notice of Allowance", U.S. Appl. No. 16/827,413, dated May 13, 2021, 9 pages.
"Corrected Notice of Allowability", U.S. Appl. No. 16/867,321, dated Jan. 6, 2021, 2 pages.
"Corrected Notice of Allowability", U.S. Appl. No. 16/867,321, dated Feb. 12, 2021, 2 pages.

(56) References Cited

OTHER PUBLICATIONS

"Corrected Notice of Allowability", U.S. Appl. No. 15/801,173, dated Jan. 28, 2021, 8 pages.
"Notice of Allowability", U.S. Appl. No. 16/867,321, dated Dec. 7, 2020, 2 pages.
"Notice of Allowance", U.S. Appl. No. 15/801,173, dated Jan. 22, 2021, 11 pages.
"Pre-Interview First Office Action", U.S. Appl. No. 15/785,329, dated Jan. 25, 2021, 4 pages.
"Corrected Notice of Allowability", U.S. Appl. No. 16/827,413, dated Sep. 1, 2021, 2 pages.
"Final Office Action", U.S. Appl. No. 15/785,329, dated Aug. 19, 2021, 12 pages.
"Final Office Action", U.S. Appl. No. 15/716,348, dated Jul. 26, 2021, 26 pages.
"Patent Trial and Appeal Board Decision", U.S. Appl. No. 15/783,228, dated Sep. 23, 2021, 20 pages.
"Non-Final Office Action", U.S. Appl. No. 15/782,517, dated Nov. 18, 2021, 35 pages.
"Non-Final Office Action", U.S. Appl. No. 15/785,329, dated Nov. 26, 2021, 7 pages.

* cited by examiner

APPLICATION DIGITAL CONTENT CONTROL USING AN EMBEDDED MACHINE LEARNING MODULE

RELATED APPLICATIONS

This Application claims priority as a divisional to U.S. patent application Ser. No. 15/785,298, filed Oct. 16, 2017, and titled "Application Digital Content Control using an Embedded Machine Learning Module," the entire disclosure of which is hereby incorporated by reference.

BACKGROUND

Personalization is used in a variety of different digital medium scenarios. A service provider system, for instance, may be configured to provide digital content to a user, such as digital audio, digital video, digital media, and so on to a user based on the user's past experience regarding consumption of digital content. Likewise, a digital marketing system may be configured to provide digital marketing content to a user based on identification of a segment of a population, to which, the user belongs. In this way, the user is provided with personalized digital content that has an increased likelihood of being of interest to the user, such as to recommend items of digital content, provide digital marketing content that has an increased likelihood of resulting in conversion, and so on.

However, knowledge of the user is required by the service provider system in each of these scenarios to support personalization, which may run counter to a user's privacy concerns. As a result, conventional personalization techniques and systems involve a balancing of interests in obtaining information about the user and the user's desire to keep personal information private. Consequently, conventional personalization techniques may be computationally inefficient and result in inaccuracies due to limitations in knowledge permitted by a user for access by these systems in order to support personalization.

SUMMARY

Application personalization techniques and systems are described that leverage an embedded machine learning module to preserve a user's privacy while still supporting rich personalization with improved accuracy and efficiency of use of computational resources over conventional techniques and systems. The machine learning module, for instance, may be embedded as part of an application from a software development kit (SDK) to execute within a context of the application to learn user preferences to train a model using machine learning.

This model is then used within the context of execution of the application to personalize the application, such as control access to digital content, make recommendations, control which items of digital marketing content are exposed to a user via the application, and so on. In this way, knowledge of the user remains within a context of the application and is not exposed outside of the application. This acts to preserve the user's privacy while still supporting personalization, which is not possible in conventional techniques and systems.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
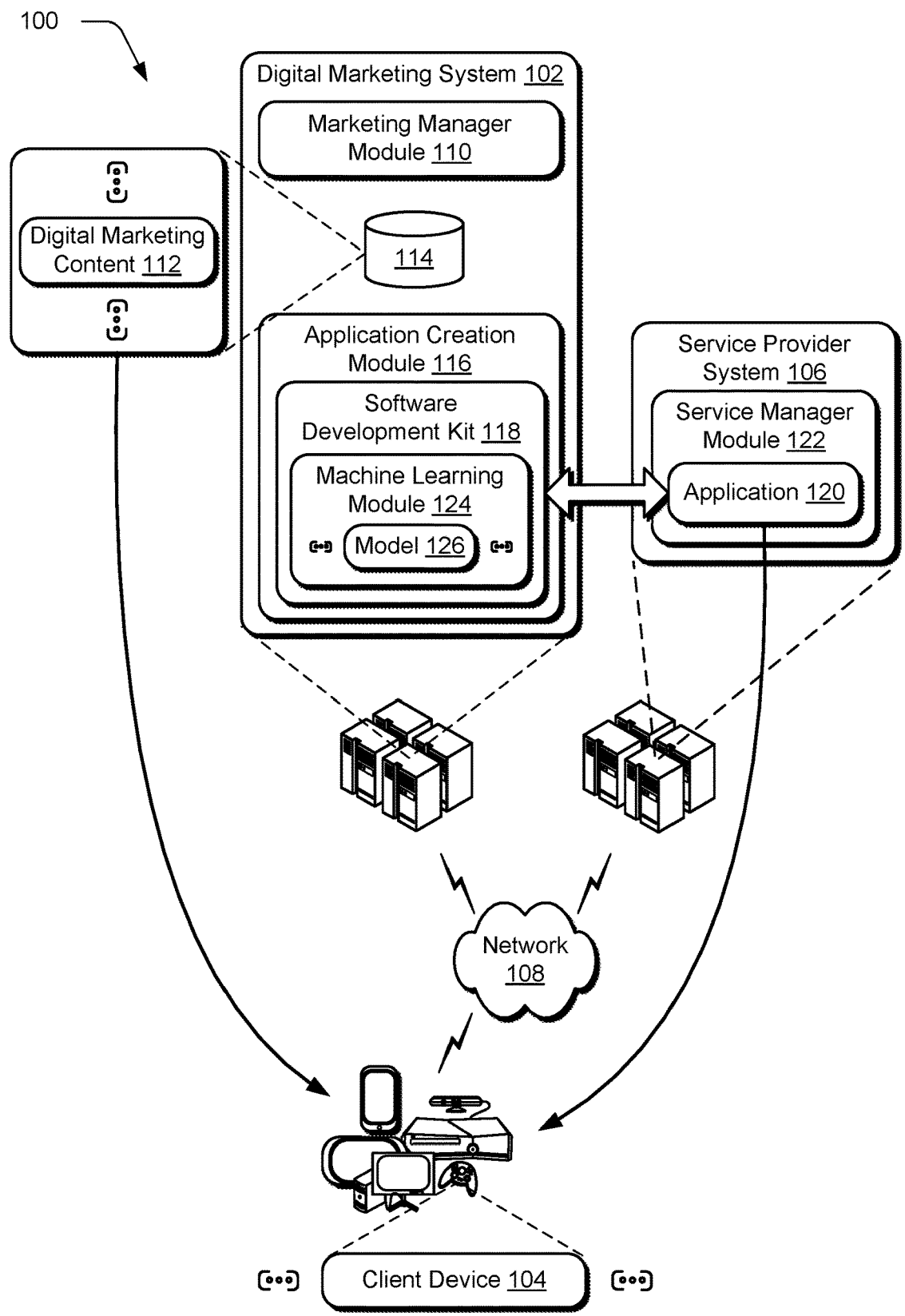
FIG. 1 depicts an example digital medium environment operable to perform embedded machine learning module and application digital content control techniques.

Techniques and systems are described in which a machine learning module is embedded as part of an application and used to control personalization of user interaction with the application. Further these techniques and systems are implemented in a manner that preserves the user's privacy, which is not possible in conventional techniques.

In one example, a software development kit is obtained that includes a collection of software development tools usable to create an application. The software development kit, for instance, may include a UI module configured to output a user interface as a visual editor via which user inputs are received to write source code, an API module configured to interact and select from a library of APIs, a debugging module to fix errors in the source code, a compiler, sample source code and graphics, documentation detailing how to use the software development tools, and so on. The software development tools also include a machine learning module that is configured to train a model using machine learning. A user coding the application, for instance, may select the machine learning module based on a variety of types of machine learning to achieve a desired result, such as to perform classification (e.g., classify user interactions such as interaction with desired and undesired user interface elements), regression, clustering, density estimation, dimensionality reduction, and so forth.

The machine learning module, as embedded as part of the application as part of source code is configured to train a model based on user interaction with the application. This model is then employed by the application to support personalization of user interaction with the application, and further, may do so while maintaining a user's privacy. This may be implemented in a variety of ways.

The machine learning module, for instance, is configured to train the model and use the model to perform personalization within a context of the application. As such, training and use of the model remains local to the application and thus does not share data used to train the model outside the context of the application. The model, for instance, may be trained based on monitored user interaction with digital marketing content and whether that interaction resulted in conversion, e.g., selection of a link, purchase of a good, and so forth.

Based on this, the application may use the model and corresponding machine learning module to control which subsequent items of digital marketing content are exposed to the user locally within an execution context of the application, e.g., by forming a recommendation for use by a digital marketing system. Thus, in this example the digital marketing system is made aware of the recommendation, itself, but is not aware how that recommendation was generated, thereby preserving the user's privacy which is not possible in conventional techniques. Further discussion of this instance is described in a corresponding section in the following description.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a digital marketing system 102, a client device 104, and a service provider system 106 that are communicatively coupled, one to another, via a network 108, e.g., the Internet. Computing devices that implement the digital marketing system 102, client device 104, and service provider system 106 may be configured in a variety of ways.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources such as personal computers, game consoles to a low-resource device with limited memory and/or processing resources, e.g., mobile devices. Additionally, a computing device may be representative of a plurality of different devices, such as multiple servers utilized by a business to perform operations "over the cloud" as described in FIG. 7 and as illustrated for the digital marketing system 102 and the service provider system 106.

Figure 7:
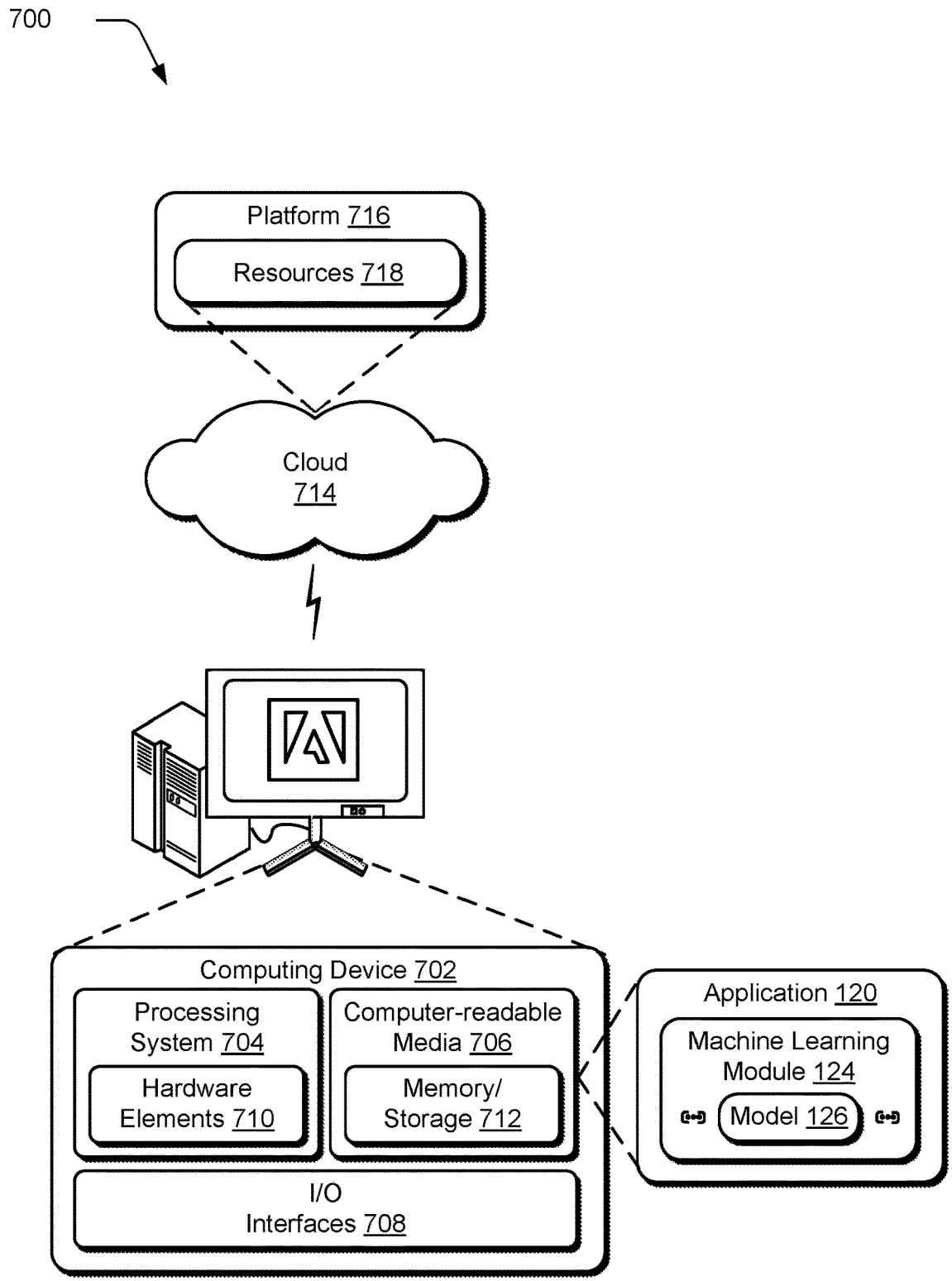
FIG. 7 illustrates an example system including various components of an example device that can be implemented as any type of computing device as described and/or utilize with reference to FIGS. 1-6 to implement embodiments of the techniques described herein.

The digital marketing system 102 includes a marketing manager module 110 that is implemented at least partially in hardware of a computing device, e.g., processing system and computer-readable storage medium as described in relation to FIG. 7. The marketing manager module 110 is configured to control output of digital marketing content 112 via the network 108 to the client device 104, and is illustrated as stored in a storage device 114. Digital marketing content 112 may be configured in a variety of ways, such as banner ads, digital video, digital images, digital audio, and so forth. The digital marketing content 112, for instance, may be configured for output in conjunction with digital content, such as a webpage, digital video, and so forth in order to cause conversion, which includes selection of a link, purchase of a good or service, and so on.

The digital marketing system 102 also includes an application creation module 116. The application creation module 116 is representative of functionality to aid in application creation, i.e., coding. An example of this functionality is illustrated as a software development kit (SDK) 118. The software development kit 118 includes a set of tools that is usable by the service provider system 106 to create an application 120. The service provider system 106, for instance, may interact with the software development kit 118 remotely via the network 108 or locally through use of a service manager module 122. Through interaction with the software development kit 118, the service provider system 106 may specify APIs for inclusion as part of the application 120, perform debugging, and so on as further described in relation to FIG. 2.

As part of the software tools, the software development kit 118 includes a machine learning module 124 that is configured to train and use a model 126 as part of machine learning within a context of execution of the application 120, e.g., by the client device 104. The software development kit 118, for instance, may be configured to support a variety of different types of machine learning models 126, such as to perform supervised, unsupervised, or reinforcement learning, decision tree learning, deep learning, neural networks, support vector machines (SVMs), Bayesian networks, representation learning, and so forth. The service provider system 106 may then select from these options from the SDK 118 to cause the machine learning module 124 to be embedded as part of the code of the application 120 for execution along with the application 120, i.e., in the context of the application 120.

Once embedded, the application 120 is provided to the client device 104 to employ machine learning to personalize user interaction with the application 120, such as to control output of digital content as part of execution of the application 120. The application 120, for instance, may be obtained directly from the service provider system 106 and/or digital marketing system 102, indirectly through use of an online application store system, and so forth. Upon execution of the application 120 by the client device 104, the machine learning module 124 may train the model 126 based on monitored user interactions within a context of the application, e.g., user interaction with digital marketing content 112 that caused conversion, items of digital content (e.g., digital music, digital videos) output or purchased, functionality of the application 120 itself (e.g., user interface elements, commands), and so on that involve interaction with application, itself.

The model 126, once trained, may be used to support personalization in a variety of ways yet still address privacy concerns in a computationally efficient manner. In one such example, the machine learning module 124 and trained model 126 is preserved within a context of execution of the application 120 such that the model 126 is used to directly control interaction with digital content. In a digital marketing scenario, for instance, the machine learning module 124 and associated model 126 may be trained based on user interaction with particular items of digital marketing content 112 and whether that user interaction resulted in conversion. Based on this trained model 126, the machine learning module 124 controls which items of digital marketing content 112 are to be output within a context of execution of the application 120 by requesting particular items of digital marketing content 112. These items are the output within a user interface of the application 120 in order to increase a likelihood of conversion by selecting items of digital marketing content 112 that are likely of interest to the user.

Thus, the machine learning module 124, as part of the application 120, may monitor which items of digital marketing content 112 are of interest to a user, train the model 126 according, and then make subsequent requests for digital marketing content 112 based on the model 126. In this way, the machine learning module 124 and model 126 provide local control and corresponding personalization without exposing how or why requests for particular items of digital marketing content 112 are made by the module to the digital marketing system 102. This acts to improve accuracy of the requests through increased access to user interactions and thus also improve efficiency in consumption of computational resources of the client device 104 due to this accuracy. Further discussion of this example is described in relation to FIGS. 2-6 in the following sections.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Application Embedding of Machine Learning Module from a SDK

In this example, the machine learning module 124 is embedded as part of the application 120 to personalize access to digital content locally as part of execution of the application 120. This personalized access is based on monitored user interaction with the application 120 that is used to train the model 126 within the application 120. As a result, the model 126 supports personalization of user interaction with the application 120 without exposing user information outside of the application 120. This acts to preserve a user's privacy in ways that are not possible using conventional techniques that rely on access to this information by third parties.

Figure 2:
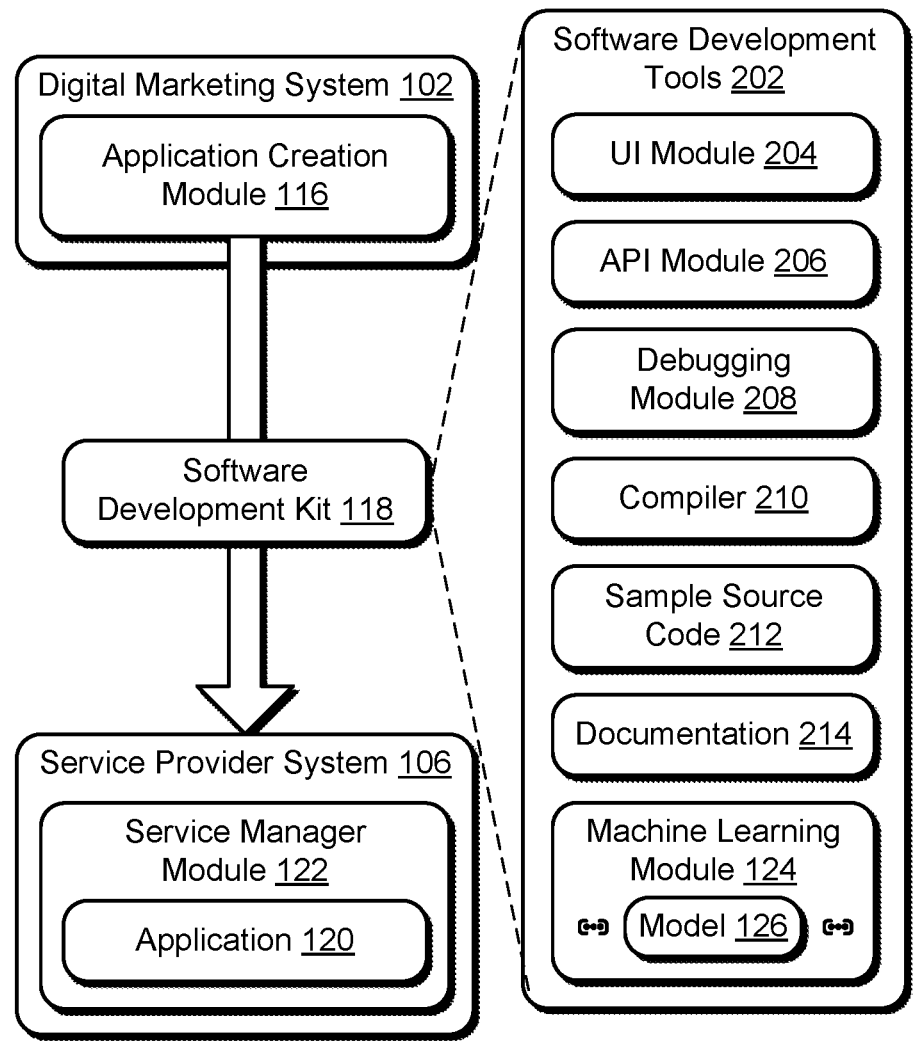
FIG. 2 depicts a system in an example implementation in which a software development kit is obtained having functionality to embed a machine learning module as part of an application.
Figure 3:
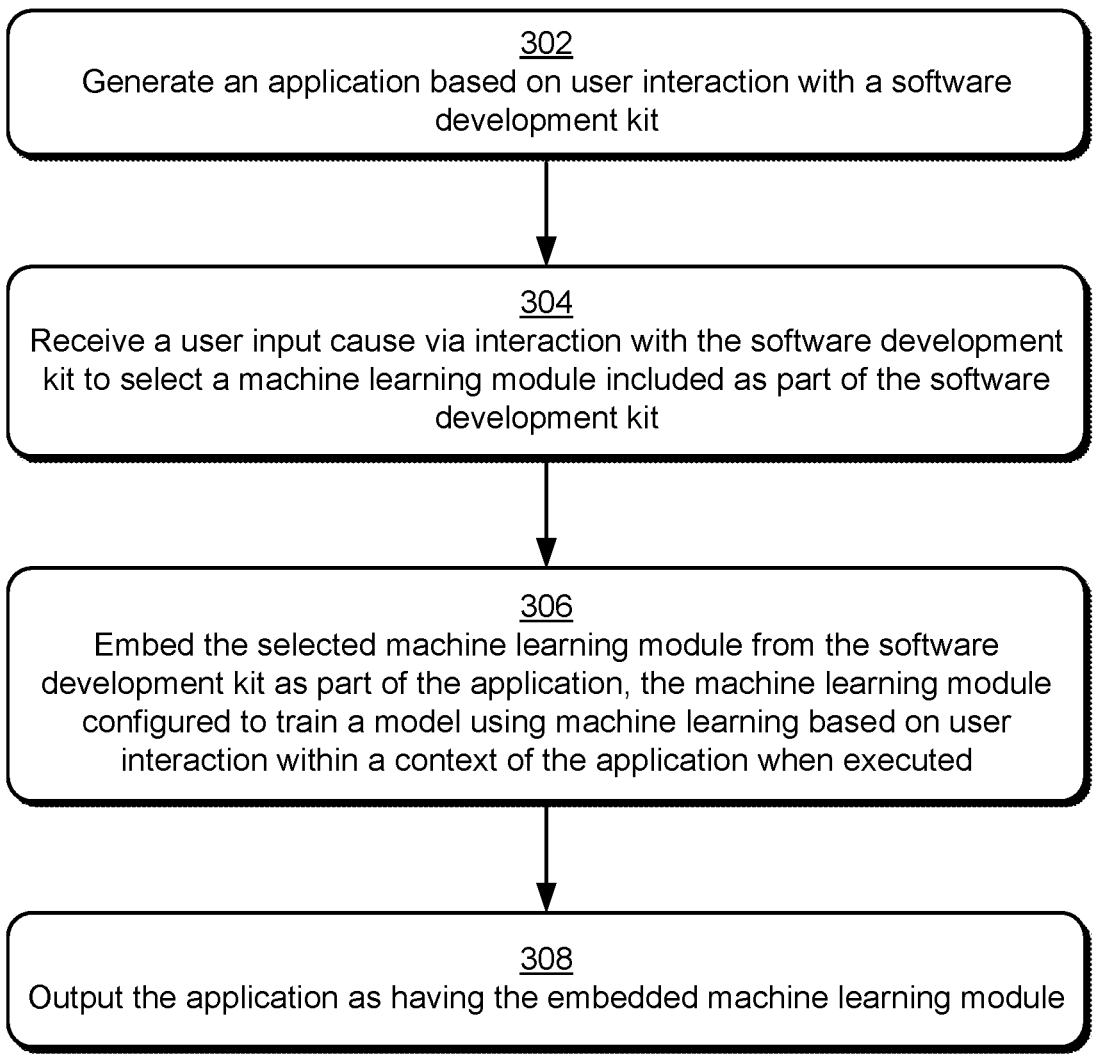
FIG. 3 is a flow diagram depicting a procedure in an example implementation in which a software development kit is obtained having functionality to embed a machine learning module as part of an application.
Figure 4:
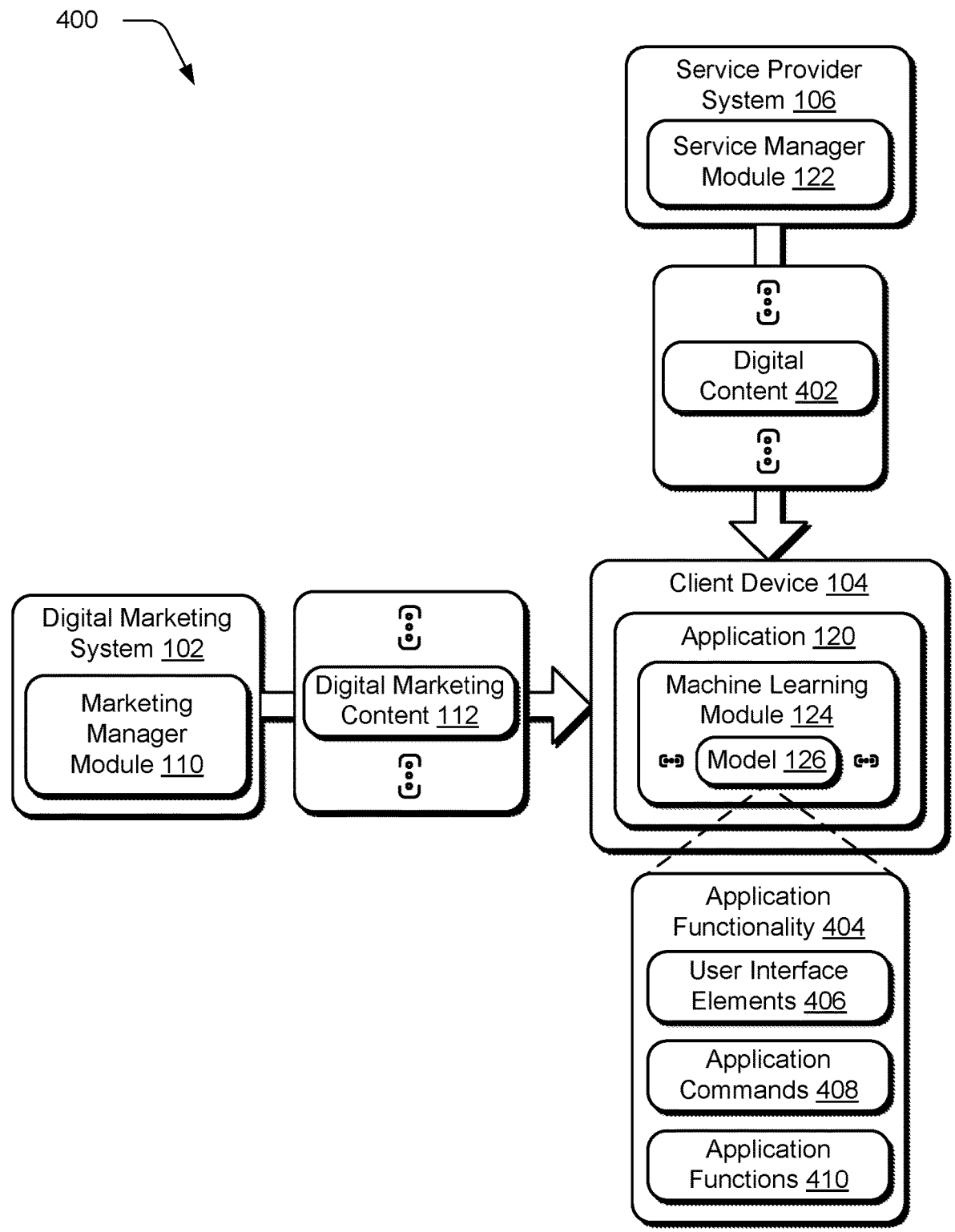
FIG. 4 depicts a system in an example implementation in which a model, embedded as part of a machine learning module within an application as described in relation to FIGS. 2 and 3, is trained within a context of execution of the application by a client device.
Figure 5:
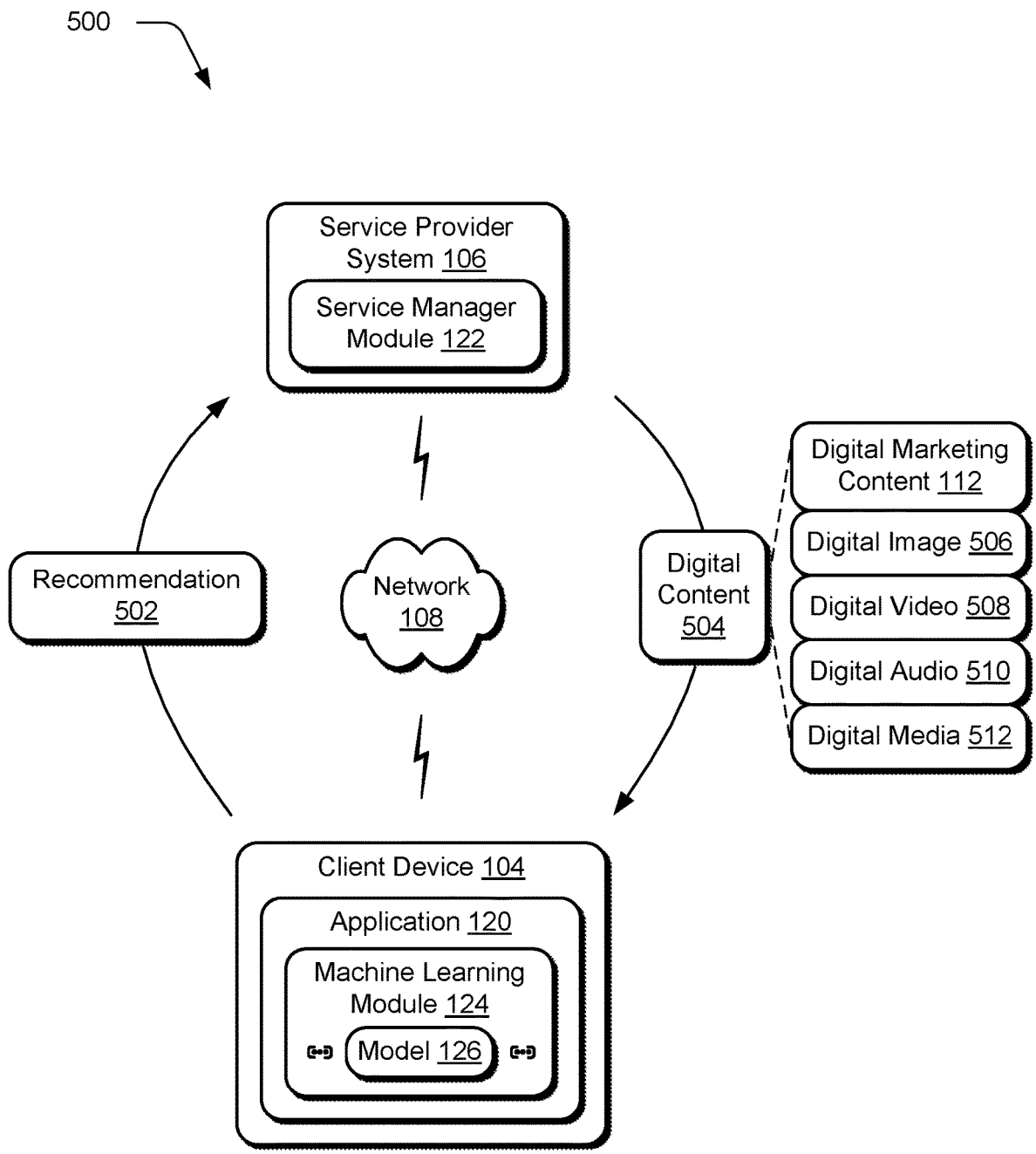
FIG. 5 depicts a system in an example implementation in which a model is employed within execution of the application to control digital content access through machine learning.
Figure 6:
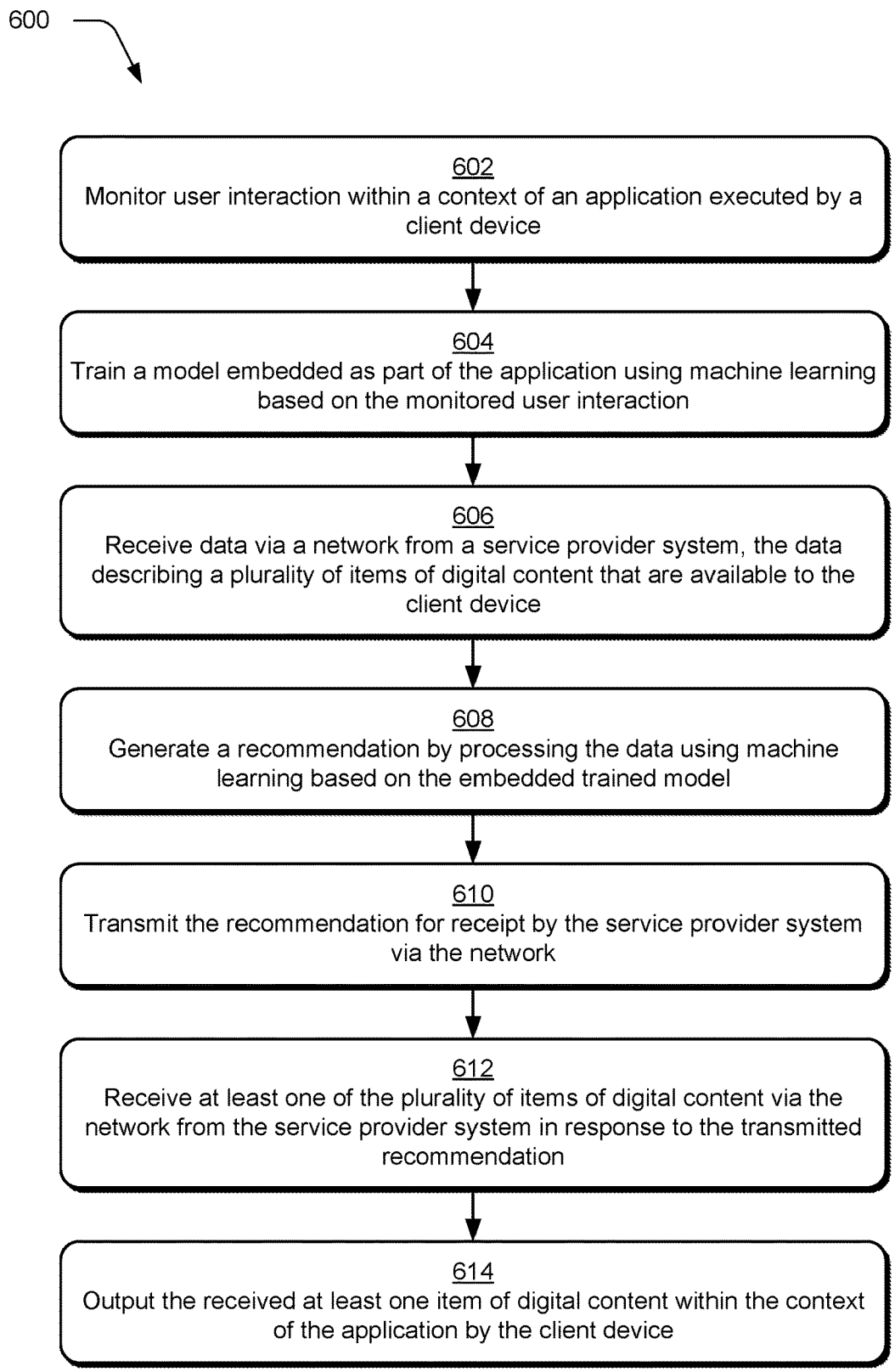
FIG. 6 is a flow diagram depicting a procedure in an example implementation in which a model embedded as part of an application is trained within a context of execution of the application and used to generate a recommendation to control output of an item of digital content.

FIG. 2 depicts a system 200 and FIG. 3 depicts a procedure 300 in an example implementation in which a software development kit is obtained having functionality to embed a machine learning module 124 as part of an application 120. FIG. 4 depicts a system 400 in an example implementation in which a model 126, embedded as part of a machine learning module 124 within an application 120, is trained within a context of execution of the application 120 by a client device 104. FIG. 5 depicts a system 500 in an example implementation in which the model 126 is employed within execution of the application 120 to control digital content access. FIG. 6 depicts a procedure 600 in an example implementation in which a model 126 embedded as part of an application 120 is trained within a context of execution of the application and used to generate a recommendation to control output of an item of digital content.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

To begin, an application 120 is generated based on user interaction with a software development kit (SDK) (block 302). As shown in the example system 200 of FIG. 2, the service provider system 106 receives the software development kit 118 from the digital marketing system 102, e.g., via the network 108. Other examples of service provider systems are also contemplated that do not involve digital marketing, such as digital content streaming service systems. The software development kit 118 includes a variety of software development tools 202 that are executed by a computing device to create an application 120.

The software development kit 118, for example, is configured to generate an integrated development environment, with which, a user or users of the service provider system 106 interact, via a computing device, to create the application 120. To do so, the software development kit 118 includes a variety of software development tools 202. Examples of these tools 202 include a UI module 204 configured to output a user interface as a visual editor via which user inputs are received to write source code, an API module 206 configured to interact and select from a library of APIs (e.g., for interaction with the digital marketing system 102), a debugging module 208 to fix errors in the source code, a compiler 210, sample source code 212 and graphics, documentation 214 detailing how to use the software development tools 202, and so on. In this way, a user may cause the service provider system 106 to generate the application 120 to address functionality that may be particular to a provider of the SDK 118, e.g., hardware or software platform implemented by the digital marketing system 102. In this example, the provider of the SDK 118 is the digital marketing system 102, although other service provider systems are also contemplated including digital content distribution systems that are configured to provide digital audio, digital video, recommendation systems, and any other system that employ an application 120 for distribution to client devices 104.

The software development kit 118 in this example also includes software development tools 202 to cause a machine learning module 124, and associated model 126, to be embedded as part of the application 120. A user input, for instance, may be received via interaction with the software development kit 118 to select the machine learning module 124 included as part of the software development kit (block 304) from a plurality of options of machine learning modules 124. Each of the machine learning modules 124, for instance, may correspond to a type of machine learning functionality and thus may be selected based on a type of functionality that is desired for inclusion as part of the application 120. A user may then interact with a user interface generated by the UI module 204 of the SDK 118 to select a machine learning module 124 having desired functionality to be embedded as part of source code of the application 120.

The machine learning modules 124, for instance, may be selected for predictive analysis, to compute a probability that a user interaction with the application 120 via a respective client device 104 will result in performance of an action, e.g., conversion with respect to digital marketing content 112, selection of an item of digital content (e.g., a recommendation for a particular digital book movie, audio), and so forth. This may be used to perform classification (e.g., classify user interactions such as interaction with desired and undesired user interface elements), regression, clustering, density estimation, dimensionality reduction, and so forth. This may be performed using a variety of machine learning techniques and models 126 as previously described, such as to perform supervised, unsupervised, or reinforcement learning, decision tree learning, deep learning (e.g., more than one hidden layer), neural networks, support vector machines (SVMs), Bayesian networks, representation learning, and so forth.

The selected machine learning module 124 from the software development kit 118 is embedded as part of the application 120 by including the module as part of the source code of the application 120. Once embedded, the machine learning module 124 is configured to train the model 126 using machine learning based on monitored user interaction within a context of the application 120 when executed (block 306). The application 120 is then output as having the embedded machine learning module 124 (block 308), such as for use by the client device 104. Further discussion of training and use of the model 126 by the machine learning module 124 is further described below.

Reference is now made to a system 400 of FIG. 4 in which the model 126 of the embedded machine learning module 124 of the application 120 is trained. The machine learning module 124 is this example is configured to monitor user interaction within a context of the application 120 as executed by the client device 104 (block 602). A model 126 is trained using machine learning that is embedded as part of the application 120 using machine learning (block 604) to train the model 126 to address a variety of considerations based on data generated from the monitored interaction. This may involve a variety of user interactions with the application 120.

In one example, the application 120 is configured to receive digital marketing content 112 from the digital marketing system 102. The digital marketing content 112, for instance, may include banner ads, digital videos, digital audio, and so on that is configured to cause conversion of a corresponding good or service. Accordingly, user interaction with the digital marketing content 112 via a user interface of the application 120, and whether such interaction caused conversion, is used to train the model 126 in this example. From this, the model 126 may be used to identify other items of digital marketing content 112 that are likely to cause conversion as further described below. Thus, this user interaction is performed within the context of execution of the application 120.

In another example, the application 120 is configured to receive other types of digital content 402 from a service provider system 106. This digital content 402, for instance, may be configured as digital audio (e.g., songs, audio books), digital books, digital images (e.g., stock images from a stock image provider system), digital videos (e.g., a service provider system 106 as a digital streaming service system for movies, television episodes, gifs), and so forth. Accordingly, in this other example the machine learning module 124 is configured to train the model 126 based on items of digital content 402 obtained and/or interacted with using the application 120. From this, the model 126 may be used to identify other items of digital content as further described below, e.g., to generate a recommendation.

In a further example, the model 126 is trained by the machine learning module 124 based on user interaction with application functionality 404 of the application 120, itself. Application functionality 404, for instance, may include user interface elements 406 (e.g., drop down menus), application commands 408 that are usable to initiate operations of the application 120 (e.g., key combinations, spoken utterances, gestures), application functions 410 of the application 120 (e.g., use of particular image filters, search tools), and so forth. Based on this, the model 126 is trained to generate recommendations for configuration of this application functionality 404, e.g., inclusion of particular user interface elements 406, prompt of application commands and functions 408, 410, and so on as further described as follows.

FIG. 5 depicts a system 500 in an example implementation in which a trained model 126 of a machine learning module 124 embedded as part of the application 120 is used to control digital content output within a context of the application 120. In this example, the model 126 is trained by the machine learning module 126 based on monitored user interaction with particular items of digital content, such as digital marketing content, digital audio, digital video, and so forth. Training data used to train the model 126, for instance, may describe actions taken by a user with respect to the digital content as well as describe the digital content itself, e.g., through metadata associated with the digital content. Accordingly, the model 126, one trained, is usable to infer likely user preferences of a user that is a source of this user interaction and thus use these inferred preferences to personalize user interaction with the application 120.

The application 120, for instance, may receive data via a network 108 from the service provider system 106. The data describes a plurality of items of digital content 402 that are available to the client device 104 (block 606). The data, for instance may describe digital content characteristics, such as the metadata associated with the digital content as described above for digital content available for streaming, digital marketing content, and so forth.

A recommendation 502 is then generated by processing the data using machine learning based on the embedded trained model 126 (block 608) of the machine learning module 124 locally by the client device 104. The recommendation 502, for instance, may describe digital marketing content 112 that is likely to cause conversion or other types of digital content 504, digital images 506 (e.g., stock images), digital videos 508 and digital audio 510 (e.g., from a streaming service system or available for local download), or other types of digital media 512. In this way, the machine learning module 124 employs the model 126 locally at the client device 104 without exposing the model 126 or information regarding how the model 126 is trained. This preserves the user's privacy while yet still supporting rich personalization in a computationally efficient manner over conventional techniques that involved exposure of potentially personal information of the user.

In the illustrated example, the recommendation 502 is transmitted for receipt by the service provider system 106 via the network 108 (block 610), e.g., without identifying how the model 126 is trained or even identifying a user associated with the model. The service provider system 106 then uses the recommendation 502 to select digital content 504 from a plurality of items of digital content 402 to be provided back to the client device 104. The recommendation 502, for instance, may identify particular characteristics of digital content 504 that is likely to be of interest, e.g., genres, products or services in a digital marketing scenario, and so forth. In another instance, the recommendation 502 identifies the particular items of digital content 504 itself based on the previously processed data, such as particular digital videos, digital audio, streaming stations, and so forth.

In response to transmission of the recommendation 502, the client device 104 receives at least one of a plurality of items of digital content 504 via the network 108 from the service provider system 106 (block 612). The received at least one item of digital content is output within the context of the application by the client device (block 614). The item of digital marketing content, for instance, is output in conjunction with other digital content output by the application 120, items of digital content 504 for consumption such as digital images 506, digital video 508, digital audio 510, digital media 512, and so forth. In this way, the machine learning module 124 and trained model 126 may act as a localized agent executed within the context of the application 120 to personalize user interaction.

Continuing with the previous examples, the application 120 may be configured to support output of digital marketing content 112. Therefore, the machine learning module 124 may monitor user interaction with previous items of digital marketing content as training data to train the model 126. Once trained, the model 126 may generate recommendations 502 identifying other items of digital marketing content 112 that are likely to be of interest to the user. In this way, the determination of which items of digital marketing content 112 is made within the context of the application without exposing this information outside of the application 120. This acts to improve accuracy and computational efficiency in obtaining a desired result, while still protecting the user's privacy as neither the training data used to train to model 126 nor even identification of the user, itself, is used to make this determination.

Example System and Device

FIG. 7 illustrates an example system generally at 700 that includes an example computing device 702 that is representative of one or more computing systems and/or devices that may implement the various techniques described herein. This is illustrated through inclusion of the application 120 having the embedded machine learning module 124 and model 126. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium application creation environment, a method implemented by at least one computing device, the method comprising:
   generating, by the at least one computing device computing device, an application having executable code, the generating based on user interaction with a software development kit as executed by the at least one computing device;
   receiving, by the at least one computing device, a user input caused via interaction with the software development kit to select a machine learning module included as part of the software development kit;
   embedding, by the at least one computing device, the selected machine learning module from the software development kit as part of the executable code of the application, the machine learning module configured to train a model using machine learning based on user interaction within a context of the application during execution of the executable code of the application; and
   outputting, by the at least one computing device, the application as having the embedded machine learning module included as part of the executable code.

2. The method as described in claim 1, wherein the software development kit includes a set of software development tools that are executable by the at least one computing device to create the application based on the user interaction.

3. The method as described in claim 2, wherein the set of software development tools includes an option to select the machine learning module from a plurality of machine learning modules configured to support different configurations of models for machine learning, one to another.

4. The method as described in claim 2, wherein the set of software development tools are configured to specify application programming interfaces and employ debugging.

5. The method as described in claim 1, wherein the machine learning module is configured to generate a recommendation based on a pattern identified in the user interaction with the application as learned during execution of the application.

6. The method as described in claim 1, wherein the machine learning module is configured to:
transmit data describing the model, once trained, via a network; and
receive a recommendation via the network in response to transmission of the data.

7. The method as described in claim 6, wherein the data describes weights assigned to respective nodes of a neural network that form the model as part of the machine learning.

8. The method as described in claim 6, wherein the data does not indicate how the model is trained.

9. In a digital medium application creation environment, a system comprising:
a processor; and
a computer-readable storage medium having instructions stored thereon that, responsive to execution by the processor, causes the processor to perform operations comprising:
generating an application based on user interaction with a software development kit as executed by the processor;
receiving a user input caused via interaction with the software development kit to select a machine learning module included as part of the software development kit;
embedding the selected machine learning module from the software development kit as part of executable code of the application, the machine learning module configured to train a model using machine learning based on user interaction within a context of the application when executed; and
outputting the application as having the embedded machine learning module included as part of the executable code.

10. The system as described in claim 9, wherein the software development kit includes a set of software development tools that are executable to create the application based on the user interaction.

11. The system as described in claim 10, wherein the set of software development tools includes an option to select the machine learning module from a plurality of machine learning modules configured to support different configurations of models for machine learning, one to another.

12. The system as described in claim 10, wherein the set of software development tools are configured to specify application programming interfaces and employ debugging.

13. The system as described in claim 9, wherein the machine learning module is configured to generate a recommendation based on a pattern identified in the user interaction with the application as learned during execution of the application.

14. The system as described in claim 9, wherein the machine learning module is configured to:
transmit data describing the model, once trained, via a network; and
receive a recommendation via the network in response to transmission of the data.

15. The system as described in claim 14, wherein the data describes weights assigned to respective nodes of a neural network that form the model as part of the machine learning.

16. The system as described in claim 14, wherein the data does not indicate how the model is trained.

17. In a digital medium application creation environment, a system comprising:
means for generating an application having executable code based on user interaction with a software development kit;
means for receiving a user input caused via interaction with the software development kit to select a machine learning module included as part of the software development kit; and
means for embedding the selected machine learning module from the software development kit as part of the executable code of the application, the machine learning module configured to train a model using machine learning based on user interaction within a context of the application when executed.

18. The system as described in claim 17, wherein the software development kit includes a set of software development tools that are executable to create the application based on the user interaction.

19. The system as described in claim 18, wherein the set of software development tools includes an option to select the machine learning module from a plurality of machine learning modules configured to support different configurations of models for machine learning, one to another.

20. The system as described in claim 18, wherein the set of software development tools are configured to specify application programming interfaces and employ debugging.

* * * * *